March 10, 1942.     P. M. MURPHY     2,275,793
DESCALING, CLEANING AND COATING MACHINE
Filed July 17, 1940     3 Sheets-Sheet 1

Inventor
Peter M. Murphy

March 10, 1942.   P. M. MURPHY   2,275,793
DESCALING, CLEANING AND COATING MACHINE
Filed July 17, 1940   3 Sheets-Sheet 2

Inventor
Peter M. Murphy
by Charles H. Hill
Attys

March 10, 1942.　　　　P. M. MURPHY　　　　2,275,793
DESCALING, CLEANING AND COATING MACHINE
Filed July 17, 1940　　　3 Sheets-Sheet 3
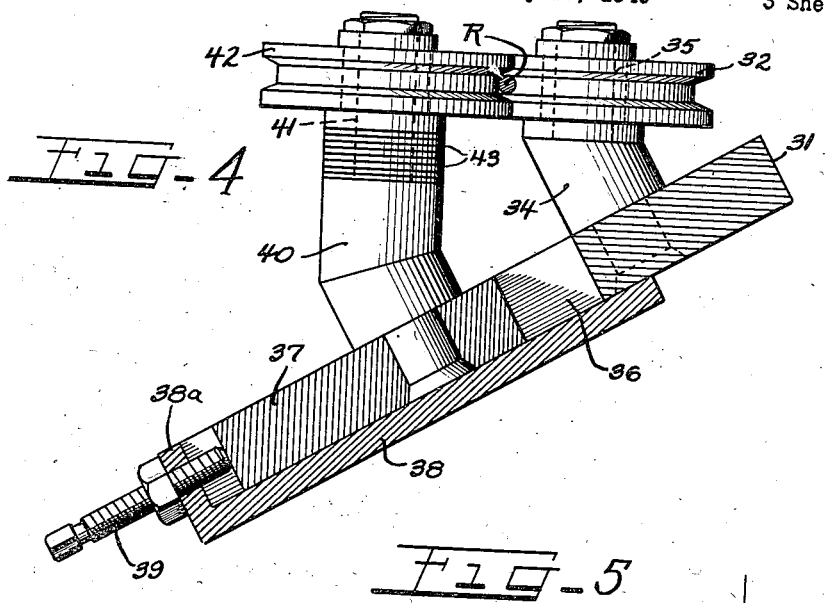
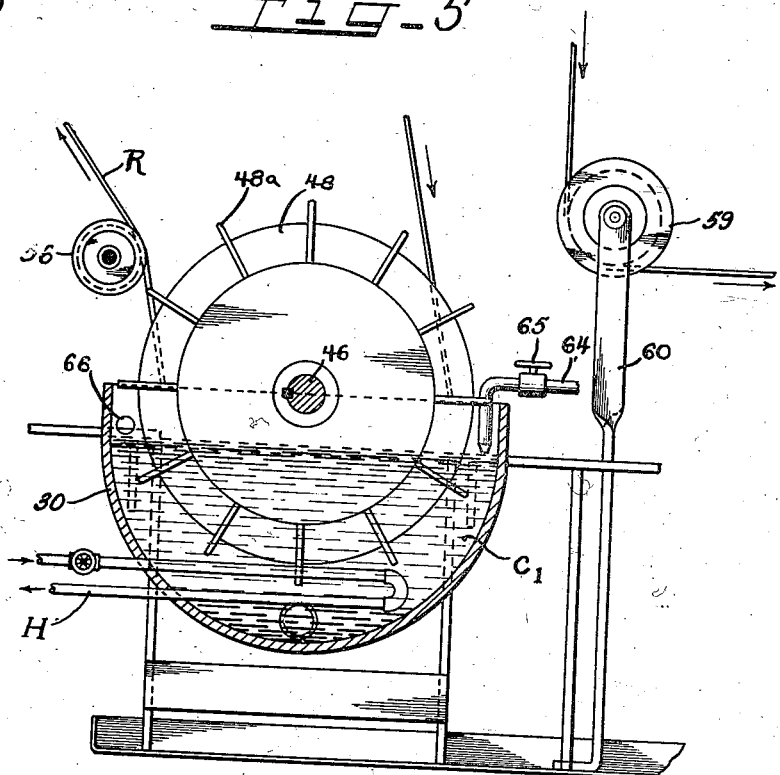
Inventor
Peter M. Murphy Patented Mar. 10, 1942

2,275,793

UNITED STATES PATENT OFFICE 2,275,793

DESCALING, CLEANING, AND COATING MACHINE

Peter M. Murphy, Sterling, Ill., assignor to Northwestern Steel and Wire Company, Sterling, Ill., a corporation of Illinois Application July 17, 1940, Serial No. 346,028

5 Claims. (Cl. 91—46)

This invention relates to the descaling, cleaning and coating of elongated metal material such as metal rods, metal strips and the like. More specifically, this invention relates to the mechanical flexing of elongated metal material to crack off any scale therefrom together with the chemical washing of the material with lime water to remove scale dust and lime coat the material. The cleaned lime coated material is adapted for immediate processing without further cleaning. The lime coating not only protects the metal against oxidation and moisture but provides a surface which will retain lubricant for protecting fabricating machinery and dies such, as for example, wire drawing dies.

Hot rolled metal rods and strips are covered with mill scale which has a very abrasive action on metal fabricating machinery and which must be removed before the metal is subjected to any cold working operations. Mechanical descaling devices have heretofore been proposed for cracking off and loosening the mill scale, but these mechanical devices always leave scale dust and some scale flakes on the metal. Many mechanical devices for removing this scale dust and semi-loosened scale flakes have been proposed, but none of these mechanical devices are entirely satisfactory nor do they render it practical to immediately fabricate the metal after the mechanical descaling operation.

It has therefore been the practice for rod and strip mills to pass the hot rolled metal rods or strips through a "cleaning house" treatment wherein the metal is subjected to a plurality of chemical baths and washers for producing a limed rod or strip capable of being cold worked or fabricated without injury to the fabricating apparatus or dies.

According to the present invention rods or strips direct from rod and strip mills are subjected to a mechanical bending or flexing operation for loosening and cracking off mill scale thereon and are then immediately treated in a chemical bath or a plurality of chemical baths for washing off the loosened scale dust and flakes and for delivering a lime coated rod or strip to a fabricating machine such as a wire drawing die, a bolt machine or the like. The mechanical descaling, the chemical treatment and the metal fabrication are all tied together in a continuous operation. The heretofore necessary "cleaning house" treatment is eliminated without interfering with the smooth and efficient operation of any cold working apparatus for fabricating the rod or strip.

According to this invention, metal rod or strip material direct from the mill is passed between a plurality of staggered descaling sheaves which flex the metal in a plurality of directions and thus crack off and loosen the mill scale. Rod or strip material direct from the descaling sheaves is wound for a plurality of turns around a drum immersed in a chemical treating bath. The drum serves to pull the metal through the descaling sheaves and also serves as a support for the metal in the treating bath. The bath is composed of hot lime water and is preferably agitated as the metal passes therethrough. The lime water washes off any remaining scale dust, smut and the like and at the same time coats the metal with lime. After passage around the drum for a plurality of turns the metal is directed out of the bath and off the drum into the atmosphere where the hot lime water film remaining on the metal soon evaporates, leaving a dried coating of lime thereon. The lime-coated metal can then be directly passed into any metal fabricating device such as a drawing die, a bolt and upsetting machine, or the like. In cases where the metal is drawn through a drawing die, the die is usually lubricated with some sort of a soap lubricant. The lime coating on the metal acts as a base for the lubricant and serves to retain lubricant thereon so that the die will be efficiently lubricated. If desired, the metal from the descaling sheaves can first be passed through an alkaline cleaning solution prior to passage into the lime water bath. This cleaning solution enhances the cleaning of the metal.

It is then an object of this invention to provide a continuous mechanical and chemical process for removing mill scale from elongated metal material such as hot rolled rods, strips and the like.

A further object of the invention is to provide simple inexpensive apparatus for continuously descaling, cleaning and coating elongated metal rods, strips and the like.

A specific object of the invention is to eliminate the heretofore necessary expensive "cleaning house" treatment of hot rolled metal rod and strip by a combined continuous mechanical and chemical descaling, cleaning and coating process.

Another specific object of the invention is to provide an inexpensive simple machine for flexing metal rod or strip to crack off and loosen mill scale therefrom and for immediately thereafter chemically treating and coating the flexed metal to remove the remaining scale dust and to provide a coated product suitable for direct fabrication into finished articles.

Another specific object of the invention is to flex metal rod or strip in a plurality of directions for cracking off and loosening mill scale therefrom and immediately thereafter passing the metal through a lime water bath maintained at temperatures around 200° F. for washing off the loosened scale dust and for coating the metal with lime.

Other and further objects will become apparent to those skilled in the art from the following detailed description of the annexed sheets of drawings which disclose preferred forms of apparatus forming part of this invention and capable of carrying out the process of this invention.

On the drawings:

Figure 4 is an enlarged vertical cross-sectional view taken along the line IV—IV of Figure 3;

Figure 5 is a vertical cross-sectional view, with parts in elevation, taken along the line V—V of Figure 2.

As shown on the drawings:

Figure 1:
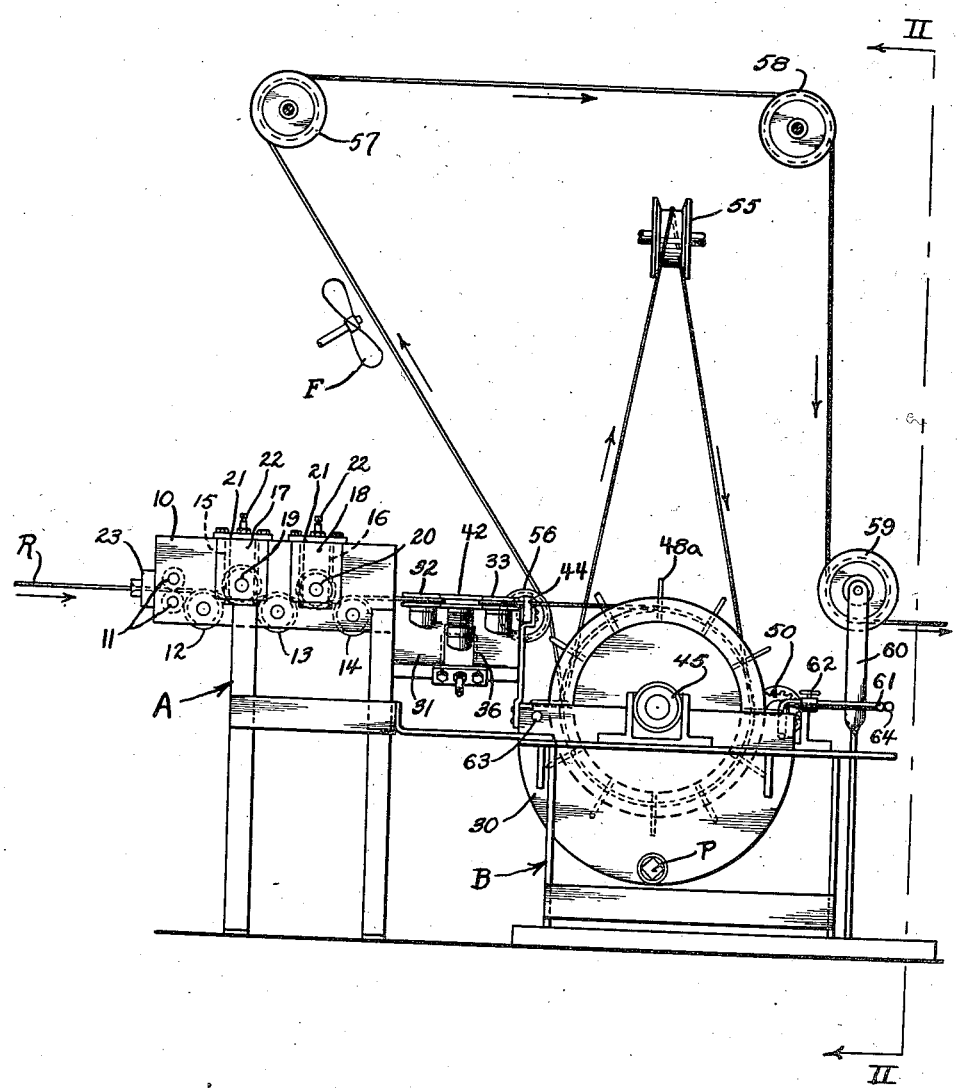
Figure 1 is a side elevational view of a descaling, cleaning and coating machine according to this invention.
Figure 3:
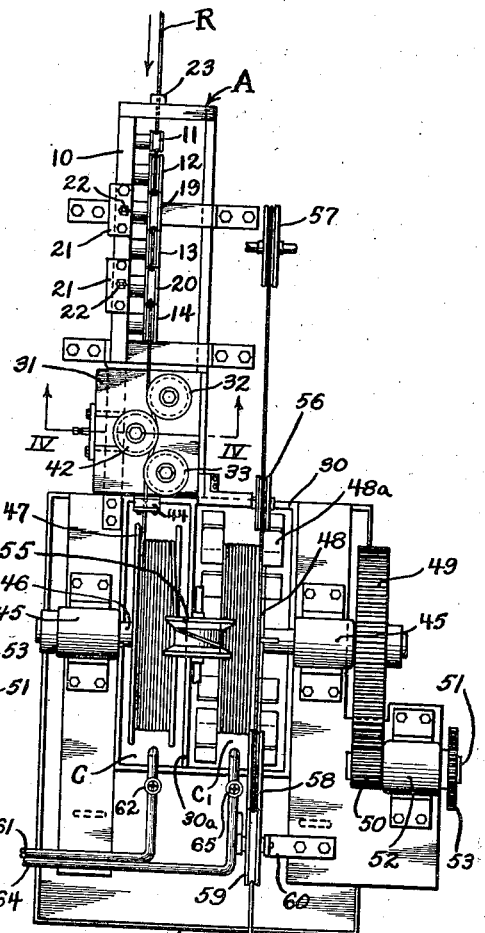
Figure 3 is a top plan view of the machine shown in Figure 1.

In Figures 1 and 3 the reference numeral 10 designates a vertical plate supported on top of a frame designated generally by the reference character A. The plate 10 rotatably supports, near the front end thereof, a pair of superimposed guide rollers 11. The plate also rotatably supports a plurality of peripherally grooved descaling sheaves 12, 13 and 14 in spaced horizontally aligned relationship. Portions 15 and 16 are cut out of the plate and receive slide blocks 17 and 18 therein. These slide blocks rotatably carry peripherally grooved descaling sheaves 19 and 20 respectively above and between the sheaves 12, 13 and 14.

Bars 21 are bolted on top of the plate 10 and bridge the open tops of the cut out portions 15 and 16. Bolts 22 are threaded through the bars for engagement against the top of the slide blocks 17 and 18 to urge the sheaves 19 and 20 downwardly for a desired distance between the sheaves 12, 13 and 14.

The frame A carries a centrally apertured guide block 23.

A rod R is passed through the guide block 23, between the guide rollers 11 and over and under the descaling sheaves shown. The rod is thus flexed and the scale thereon is loosened and cracked off by the flexing operation. If desired, the rollers 11 can have sharp scarifying rod receiving peripheries to scratch the scale for facilitating the cracking off operation as the rod passes between the sheaves.

A tank 30 is suspended in a framework B in spaced longitudinal relation from the frame A.

A second plate 31 tilted preferably at a 45° angle is suspended between the frames A and B as shown and rotatably carries a pair of horizontally aligned peripherally grooved descaling sheaves 32 and 33. The sheaves 32 and 33 are mounted on vertical axes so that their peripheries will act on the rod R at right angles to the peripheries of the descaling sheaves carried by the plate 10. As best shown in Figure 4, inclined spacer members or bosses such as 34 provide support for the vertical axles 35 of the sheaves.

The plate 31 has a centrally cut out portion 36 receiving a slide block 37 therein. The slide block is backed by a stationary plate 38 holding the block in the cut out portion 36 and providing an end wall 38a bridging the open end of the cut out portion and receiving an adjusting bolt 39 therethrough to urge the block toward the inner end of the cut out portion 36.

A boss 40 is mounted on the slide block 37 projects vertically therefrom. The end of the boss has a reduced axle portion 41 thereon receiving a sheave 42 in rotatable relation therearound. The sheave 42 is positioned between the sheaves 32 and 33 as shown in Figures 1 and 3.

The bolt 39 is therefore operative to move the sheave 42 between the sheaves 32 and 33 for any desired distance in order to control the amount of flexing of the rods passing over the sheaves 32 and 33. Since the slide block 37 is inclined, and since it is desirable to maintain the sheave 42 in horizontal alignment with the sheaves 32 and 33, a plurality of washers or spacers 43 may then be disposed around the axle 41 under the sheave. Thus when the slide block 37 is moved further into the cut out portion 36 a washer 43 can be removed to drop the sheave 42 so that it will be in horizontal alignment with the non-adjustable sheaves.

The rod passing over the sheave 14 then passes into the sheave 32 on the inclined plate which acts on the rod in a horizontal direction. The sheave 42 next flexes the rod horizontally to further crack off and loosen scale therefrom. The sheave 33 supports the rod for action by the adjustable sheave 42. The supporting plate 31 is tilted so that cracked-off scale cannot accumulate around the sheaves and re-contact the rod.

A guide block 44 receives the rod therethrough from the sheave 33.

The tank 30 has a vertical partition wall 30a therein dividing the tank into a compartment C aligned with the guide block 44 and a second compartment C₁ on the back side of the apparatus.

The framework B carries bearing blocks 45 on each side of the tank 30 and a shaft 46 is rotatably mounted in the bearing blocks and extends across the open top of the tank. A drum 47 is mounted on the shaft 46 for rotation in the compartment C of the tank. A second drum 48 is mounted on the shaft 46 for rotation in the compartment C₁ of the tank. The shaft 46 is driven by a large gear 49 from a pinion 50 on a stub shaft 51 rotatably carried in a bearing block 52 mounted on the frame B. The stub shaft 51 is driven by a sprocket 53. The sprocket 53 in turn is driven by a chain, not shown, connected with a prime mover or a moving portion of a fabricating machine with which the apparatus of this invention can be synchronized.

The rod R is wound for about 10 or 12 turns about the drum 47 and is then passed from the drum over an overhead sheave 55 rotatably mounted in spaced relation above the tank 30. After passage over the sheave 55 the rod is directed downwardly and around the drum 48 for 10 or 12 turns. From the drum 48 the rod i directed over the guide wheel 56 to an overhea( guide wheel 57, thence horizontally to a spacer guide wheel 58 above the sheave 55, thence downwardly under a guide wheel 59 rotatably carried in a support 60 from the main frame B for travel into a drawing die or other fabricating machine (not shown).

The drum 48 has a plurality of paddles 48a formed around the periphery thereof for agitating material in the tank compartment $C_1$.

The compartment C is supplied with an alkaline liquid such as an aqueous caustic alkaline solution through a feed pipe 61 having a valved end 62 communicating with the top portion of the compartment. Excess solution is removed from the top portion of the tank through an opening 63 shown in Figure 1. The alkaline solution is preferably heated and may either be supplied in a heated condition through the pipe 61 or the compartment C can be equipped with a heater, for heating the alkaline solution in the tank. This heater can take the form of a steam coil, an electric heater, or any other means capable of heating a liquid.

The compartment $C_1$ is supplied with lime water through an inlet pipe 64 having a valved end 65 communicating with the top of the compartment. Excess water can overflow from the compartment $C_1$ through an overflow outlet 66 in the top of the tank (Figure 5). The lime water can be supplied in a heated condition through the inlet pipe 64, or a heater, such as a steam coil H, can be mounted in the compartment C in the manner shown in Figure 5.

The lime water is preferably maintained saturated with lime and heated near the boiling temperature of the suspension or around 200° F. If desired, the compartment $C_1$ can initially be filled with lime water and live steam can be injected into the compartment from the pipe 64. This live steam will heat the lime water and lime paste or dry lime can be incorporated into the lime water to replace the suspension and removed lime. In a similar manner the alkaline treating chemical could be introduced in solid or paste form in the compartment C and steam could be injected into the compartment for maintaining a heated alkaline solution therein.

The apparatus shown in Figures 1 to 5 receives an untreated hot rolled rod first through the mechanical de-scaling or rod flexing end thereof. The rod is flexed in a plurality of directions to crack off and loosen scale therefrom. The first set of sheaves in the descaling end of the machine acts in a vertical plane on the rod and the cracked off and loosened scale is free to fall away from the rod. The second set of sheaves mounted on the plate 31 acts on the rod in a horizontal plane to flex the rod sideways or horizontally. The plate 31 is inclined preferably about 45° so that the cracked-off scale will fall free of the sheaves thereon away from the rod.

After passage through the mechanical descaling portion of the machine, the rod is wound for a plurality of turns around the drum 47 which is positively driven as explained above. The drum 47 serves to pull the rod through the descaling sheaves and also serves as a support for immersing the rod in the alkaline cleaning solution in the compartment C in the tank 30. After the rod is immersed a plurality of times in the cleaning solution while supported on the drum 47 it is directed above the machine over the sheave 55 and then around a second drum 48 where it is immersed a plurality of times in the lime water compartment $C_1$ of the tank. The lime water is continually agitated by the paddles on the drum 48 and the rod is further cleaned and simultaneously coated with lime. The drum 48 is driven at the same speed as the drum 47 from the common shaft 46.

After travel around the drum 48 for a plurality of turns, the rod is directed upwardly over a guide wheel 57 above the machine and above the sheave 55. As the rod passes upwardly to this guide wheel 57 it can be subjected to a blast of air from a fan such as F illustrated in Figure 1. The lime coating on the rod is thus dried. If the length of travel of the rod in the atmosphere above the machine is appreciable the fan F need not be used, as the hot lime coating on the rod will rapidly dry in the atmosphere. The lime coated rod can be passed directly into a drawing die or other metal fabricating apparatus. In the event that the rod is to be lubricated before it is fabricated the lime coating on the rod serves as an excellent medium for picking up the lubricant. The lime coating also protects the rod against oxidation and moisture.

Figure 6:
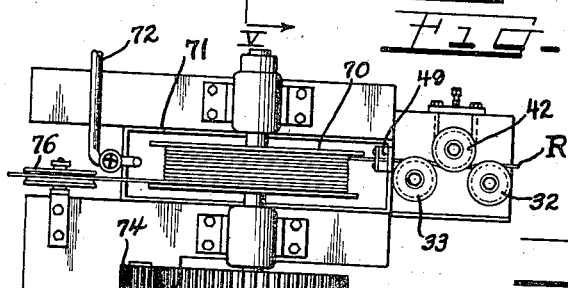
Figure 6 is a top plan view of a simplified form of a machine according to this invention wherein only one treating tank is used.

If desired the alkaline cleaning solution portion of the apparatus can be eliminated as shown in Figure 6. In Figure 6, the rod R from the horizontally aligned sheaves 32, 42 and 33 can pass directly through the guide 49 around a drum 70 rotatably mounted in the tank 71 containing lime water. The lime water is supplied from an inlet 72. The drum 70 is driven through a gear train including gears 73 and 74 from a sprocket 75 driven directly from a prime mover or from a moving part of a fabricating machine (not shown). After passage around the drum 74 a plurality of turns the rod can be directed over a guide wheel 76 into the atmosphere for a predetermined length of travel to dry the lime coating on the rod.

In the apparatus shown in Figure 6 therefore the rod is subjected to a mechanical descaling by flexing and a lime cleaning and coating operation.

Figure 2:
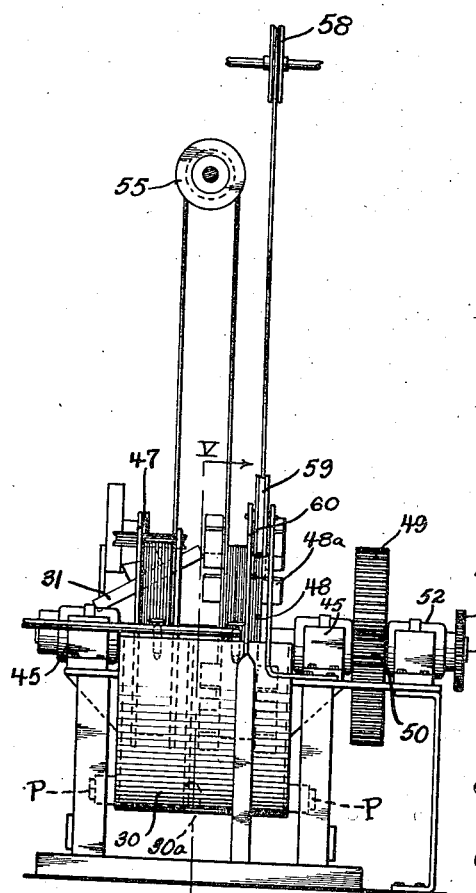
Figure 2 is a rear end elevational view of the machine shown in Figure 1 taken along the line II of Figure 1.

As shown in Figure 2 the compartments C and $C_1$ of the tank 30 can be emptied by means of drain plugs P threaded into the bottom portion of the tank.

The treatment of the rod in the single tank compartment or in the double tank compartments serves to wash off the remaining loosened scale both by an agitating washing operation and by chemical treatment. At the same time the rod is coated with lime in one of the treating tanks so that a lime coated clean rod is delivered as the product of the apparatus.

The rod is wrapped for a desired number of turns around positively driven drums extending into the treating bath to control the thickness or amount of the lime coating on the rod. These drums preferably carry the rod out of the bath during each revolution so that multi-immersion of the rod is obtained. As each turn of the rod on the drum comes up out of the lime bath and contacts the air, the lime coating on the rod is somewhat set so that an additional amount of lime will be coated onto the rod during the next immersion of the bath. A cumulative coating is thus obtained and the extent of the coating is determined by the number of turns of the rod on the drum.

Since the drums actually pull the rod through the mechanical descalers, as well as through the coating baths, and deliver the rod to any subsequent rod-fabricating machinery, no strain is placed on the rod being fabricted. This is important when the rod is passed through drawing dies, since the rod ahead of the die need not lie under tension when apparatus of this invention is used. The lime coating on the rod also serves as an efficient base for any die lubricant used.

While the apparatus has been specifically described in the drawings in connection with a rod-treating machine, it should be understood that the invention is adapted for use on strip stock and the particular shape of the elongated metal material being treated is not important. If strip stock were used, the descaling sheaves would be arranged to receive a flat ribbon instead of a round rod.

I claim as my invention:

1. A machine for cleaning metal wire, rods or strips to remove mill scale therefrom which comprises a pair of adjacent drums receiving a plurality of turns of the metal material therearound, an overhead guide above the drums for directing the metal material from one drum to the next, tanks partially surrounding said drums for immersing the metal material thereon in baths maintained therein, and common means for positively driving both drums.

2. A machine for cleaning metal wire, rod, or strip material which comprises first and second adjacent drums each receiving a plurality of turns of the metal materiel therearound, means for co-rotating said drums, a sheave spaced vertically above the space between said drums for directing the metal material from the first drum to the second drum, tanks having liquid baths therein, means maintaining the level of said baths below the tops of said drums, means for agitating one of said baths, and spaced shelves above said first sheave for directing the metal material from said second drum.

3. A machine for cleaning metal wire, rod or strip material which comprises a tank having a plurality of adjacent compartments in side by side relation, a drum rotatably mounted in each compartment receiving a plurality of turns of the metal material therearound, a common drive shaft for all of said drums, means feeding the metal material to a receiving point on the first drum, a transfer guide receiving the metal material from the discharge point of said first drum to direct the material to the receiving point of the adjacent drum, and means spaced from said transfer means for guiding the metal material away from the discharge point of said adjacent drum whereby said compartments are adapted to receive liquid baths at levels below the tops of the drums and said drums are adapted to multi-immerse the metal material in each bath.

4. The continuous method of treating descaled elongated metal material which comprises feeding said material in a coiled path, immersing the material as it advances along said coiled path for a plurality of times in a hot caustic alkali solution, draining the caustic alkali solution from the multi-immersed metal, again feeding the metal in a second coiled path, immersing the metal as it advances along said second coiled path for a plurality of times in a heated lime bath, contacting the metal material with the atmosphere between each immersion to build up a lime coating on the material, and drying the metal material after the final immersion in the lime bath to produce a clean lime-coated metal material free from deleterious mill scale.

5. The continuous process of treating descaled elongated metal material which comprises feeding said material in a coiled path, partially immersing the material in a lime bath as it advances around said coiled path, alternately exposing the metal material to the atmosphere between immersions to build up a lime coating on the material, and drying the material after the final immersion to produce a clean lime-coated material free from deleterious mill scale.

PETER M. MURPHY.